United States Patent [19]

Keller

[11] 4,139,078

[45] Feb. 13, 1979

[54] LADDER ASSEMBLY

[76] Inventor: John R. Keller, R.R. #2, Hamilton, Ontario, Canada

[21] Appl. No.: 846,354

[22] Filed: Oct. 28, 1977

[30] Foreign Application Priority Data

Feb. 2, 1977 [GB] United Kingdom ............... 4317/77
May 7, 1977 [GB] United Kingdom ............. 19242/77

[51] Int. Cl.$^2$ ............................................. E06C 5/04
[52] U.S. Cl. .................................. 182/88; 182/209; 182/228; 182/93; 280/166
[58] Field of Search ............... 182/88, 89, 93, 195, 182/85; 280/166

[56] References Cited

U.S. PATENT DOCUMENTS

| | | | |
|---|---|---|---|
| 2,279,329 | 4/1942 | King | 182/88 |
| 2,647,677 | 8/1953 | Reed | 182/88 |
| 2,860,822 | 11/1958 | Smith | 182/93 |
| 2,922,557 | 1/1960 | Jessen | 182/88 |
| 3,434,566 | 3/1969 | Miller | 182/88 |
| 3,774,720 | 11/1973 | Hovey | 182/88 |

Primary Examiner—Reinaldo P. Machado
Attorney, Agent, or Firm—Dennison, Dennison, Meserole & Pollack

[57] ABSTRACT

A ladder assembly, primarily for use on trucks and other vehicles, has a ladder slidable between a retracted, stored position in a ladder storage assembly, and an extended, operative position in which the ladder projects from an extrance of the storage assembly. First and second retainers are provided for retaining the ladder relative to the storage assembly in the stored and operative positions, respectively, and the ladder has opposed lateral projections slidable along guides formed by parallel side members having U-shaped cross-sections the side members being spaced apart to receive the ladder therebetween and forming opposite sides of the storage assembly.

5 Claims, 14 Drawing Figures

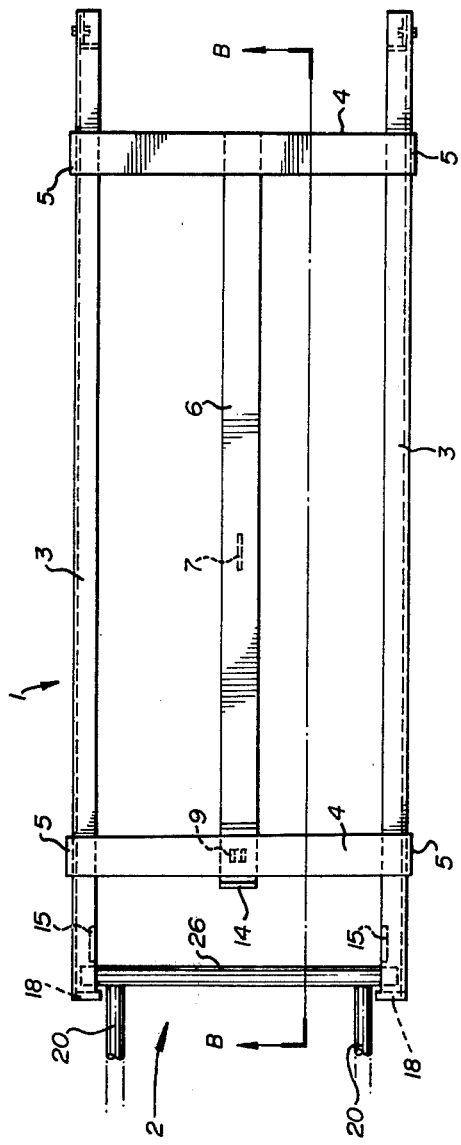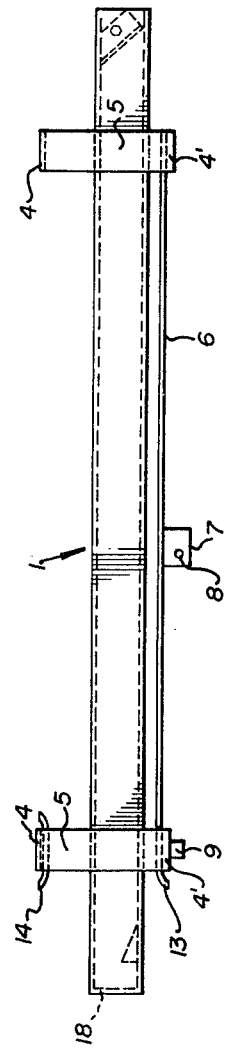
FIG. 3
FIG. 4

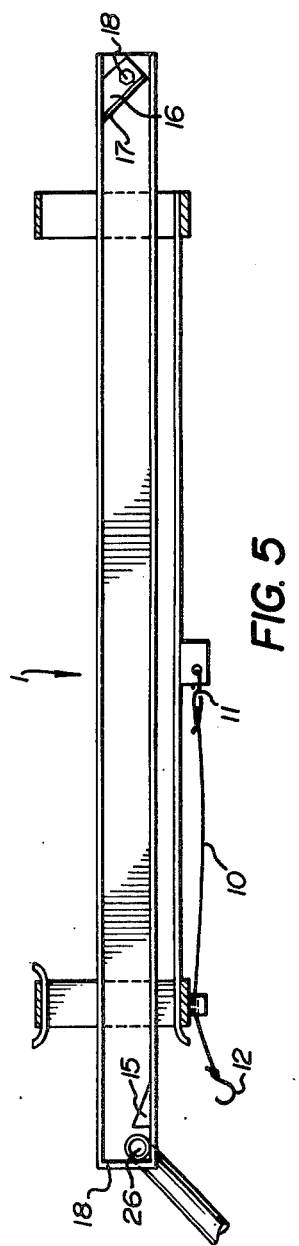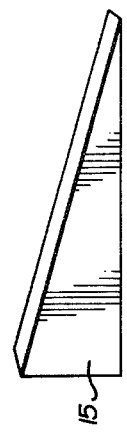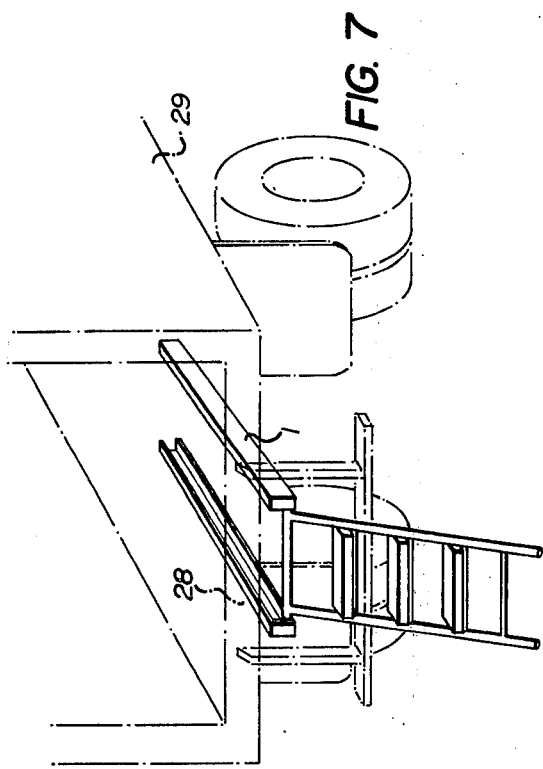

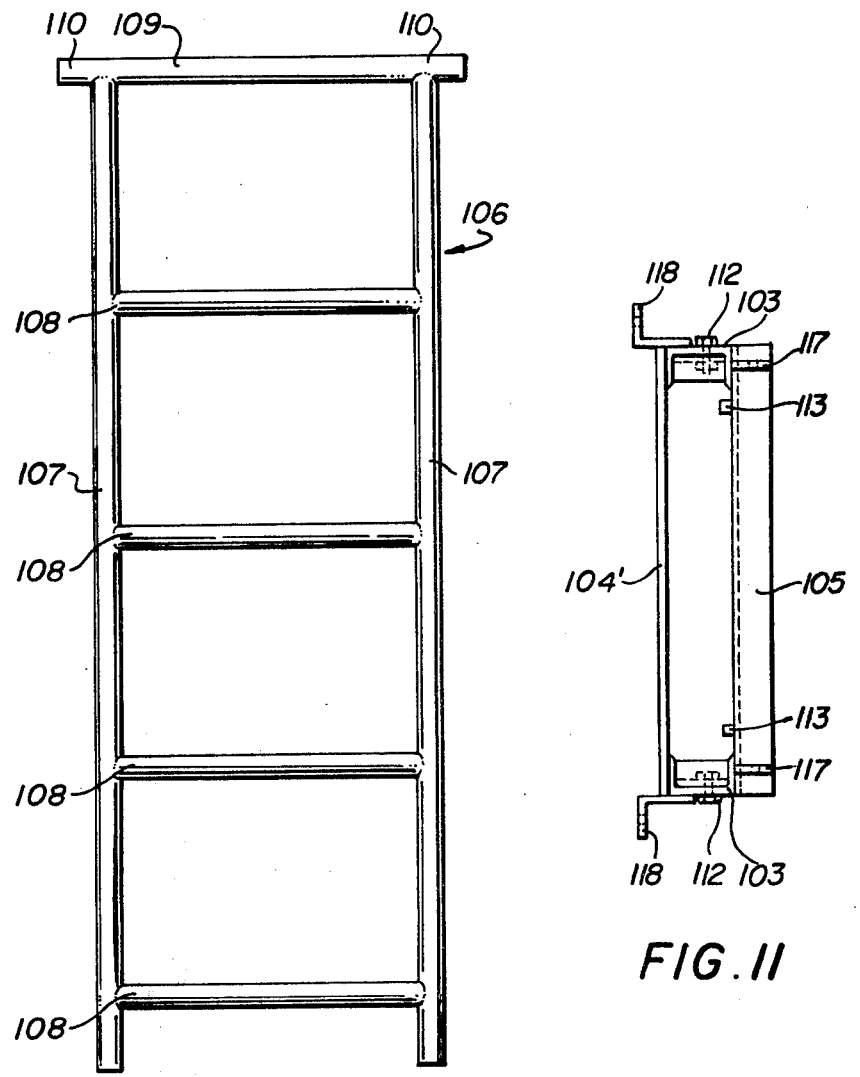

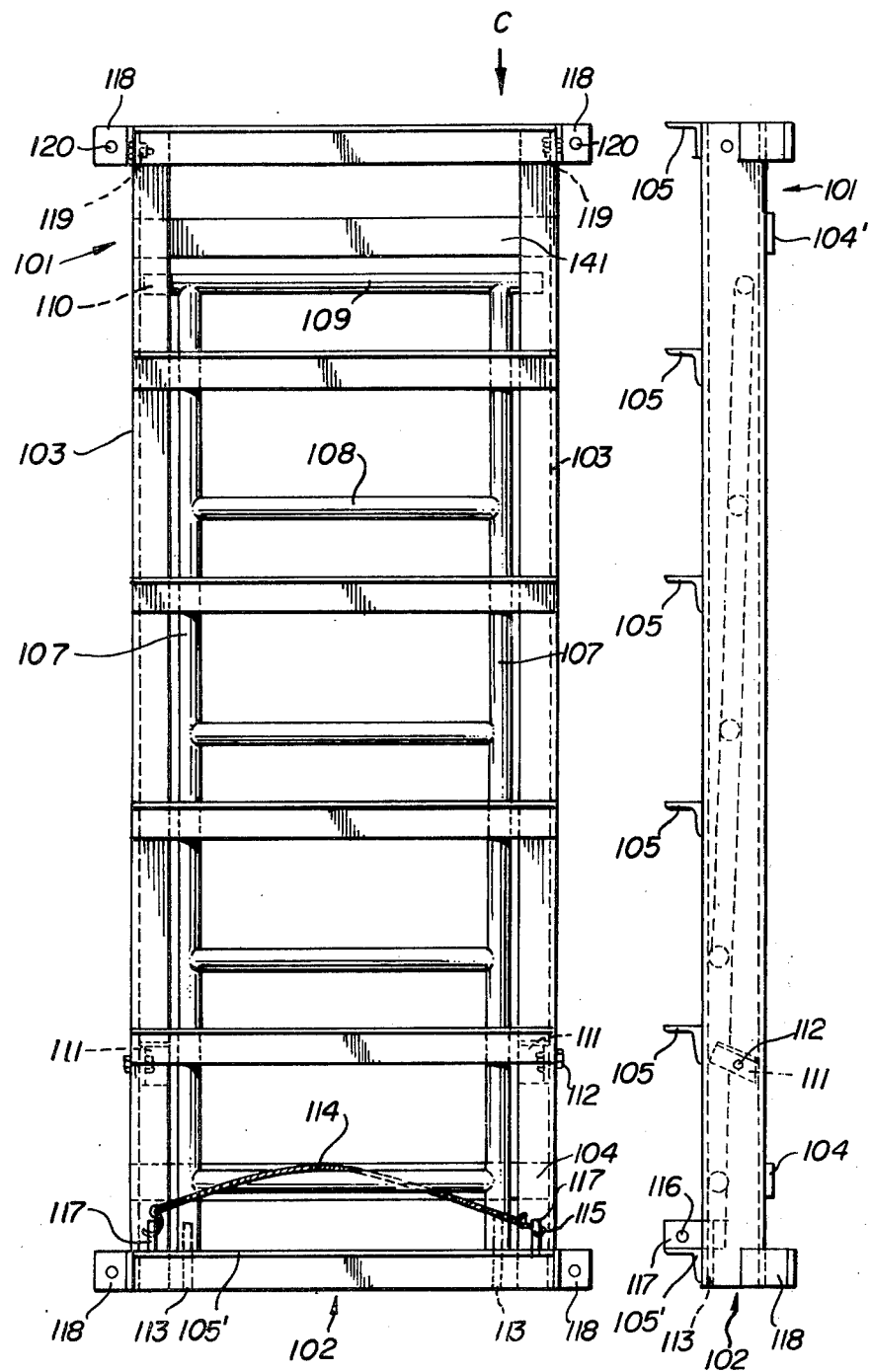

LADDER ASSEMBLY

FIELD OF THE INVENTION

The present invention relates to a ladder assembly primarily for use in conjunction with open trucks and vans.

Due to the increasing extent to which trucks and vans are utilized to transport articles and goods from one location to another, the truck industry has, in recent years, placed on the market a wide variety of commercial vehicles with specifications to suit any type of transportation requirement. In addition to such commercial vehicles, there has, in recent years, been a steady increase in the popularity of home trailers and converted vans for domestic use, particularly for camping and other recreational purposes. Due to the nature of the construction of these vans and trucks, the loading surface behind the driving area is usually positioned at a not insignificant distance above ground level (usually at least 3 feet), this distance depending in part, on the diameter of the wheels of the vehicle. Accordingly, access to the loading surface from ground level may require considerable effort, particularly in respect of a large van or truck where the loading surface is more than three feet above ground level.

Also, in view of the increasing extent to which trucks and trailers are employed to transport loose material such as sand and gravel from one location to another, there has been increasing concern recently regarding the safety precautions which should be taken by the operators of loaded trucks in order to minimize the possibility of the load either shifting considerably or spilling out of the truck either when the truck is travelling along the highway or, more particularly, when the truck is involved in a road accident. Such spilling of the load onto the highway is not only wasteful and time consuming for the operator of the truck but also constitutes a serious hazard for other traffic on the highway in particular that which is following immediately behind the truck.

In view of the above-mentioned risks and hazards, new regulations under the Highway Traffic Acts of several countries are being evolved which require that a tarpaulin, netting or some other material capable of confining the load on a truck carrying, for example, sand, gravel, crushed stone, slag, a sand-and-salt mixture, shredded scrap metal or garbage, is employed on the truck whenever the truck is transporting the load from one location to another.

A major consequence of such new regulations is that it is going to be necessary for the operators of trucks and trailers carrying loads of loose material to install and remove tarpaulins or nettings much more frequently which means that the overall time taken both to prepare the truck for the road and to unload the truck will be increased. In addition, tarpaulins in particular are often heavy and inconvenient to handle especially when being placed over loads in trucks which are long and high.

DESCRIPTION OF THE PRIOR ART

The problem of accessibility to the loading surface of a van or truck has been overcome, in the past, by the use of a step ladder which is simply inclined against the loding surface of the vehicle. However, the use of step ladders in this way has several disadvantages, in particular the possibility that the ladder will slip away from the loading surface while the person is on the ladder, thereby causing personal injury. Furthermore, such a separate step ladder has to be stored either in the goods area of the van or truck or at some other location, which storing is inconvenient and time-consuming.

Another arrangement which has been employed to facilitate access to the loading surface of a truck or van is a hydraulically operated ramp assembly which can be operated by a single person, either at ground level or in the loading area of the van or truck. Although such hydraulic systems have the advantage of ease of operability, they are subject to break-down. They require regular maintanence to keep them in working order and, furthermore, they are expensive to manufacture and install.

OBJECTS OF THE INVENTION

It is an object of the present invention to mitigate at least some of the various disadvantages outlined above which are associated with the prior systems. It is a further object of the present invention to provide ladder assemblies which are not expensive to produce or install, are easily manipulated by a single person, enable the ladder to be stored when it is not in use, and are designed so that the ladder, when in use, cannot slip away from the loading surface of the vehicle thereby inflicting injury to the person on the ladder.

A still further object of the present invention is to provide a safety ladder assembly which facilitates handling of tarpaulins or netting by the operator of the truck.

Although the ladder assemblies of the present invention are primarily designed for use in combination with open trucks and vans to facilitate entry to and exit from the loading area thereof, it will be appreciated that the present ladder assemblies can also be used, not only in, for example, home trailers and railway carriages, but also in any other situations (not necessarily mobile) where, from time to time, easy access from a lower level to an upper level is desired (for example from the living area of a house up to the attic).

BRIEF SUMMARY OF THE INVENTION

According to the present invention, there is provided a ladder assembly comprising ladder storage means having an entrance at one end thereof, a ladder slidable relative to the ladder storage means through the entrance between a retracted storage position in the ladder storage means and an extended operative position in which the ladder projects from the ladder storage means, first retaining means for releasably retaining the ladder in the storage position, second retaining means for retaining the ladder relative to the ladder storage means when the ladder is in the operative position.

BRIEF DESCRIPTION OF THE DRAWINGS

An embodiment of the present invention will be now described by way of example, with reference to the accompanying drawings, in which:

FIG. 3 is a plan view of the storage means of the ladder assembly showing, in part, the ladder in the withdrawn position;

FIG. 4 is a side elevational view of the storage means shown in FIG. 3 with the ladder removed;

FIG. 5 is a cross-sectional view of the storage means of FIG. 3 taken along the line B—B shown in FIG. 3;

FIG. 6 is a slightly enlarged perspective view of the ladder retaining means;

FIG. 7 is a perspective view showing the ladder assembly in position beneath a loading surface of a truck with the ladder in the fully withdrawn position;

FIG. 8 is a front elevational view of a ladder for use in a modified ladder assembly embodying the present invention;

FIG. 9 is a front elevational view of the ladder assembly of FIG. 8 showing the ladder in the upper position within the ladder storage means;

FIG. 10 is a side-elevational view of the assembly of FIG. 9 with the safety cord shown in FIG. 9 removed;

FIG. 11 (which appears on the same sheet as FIG. 8) is a plan view of the ladder storage means shown in FIG. 9 in the direction of arrow C with the ladder removed for clarity;

DESCRIPTION OF THE PREFERRED EMBODIMENTS

Figure 1:
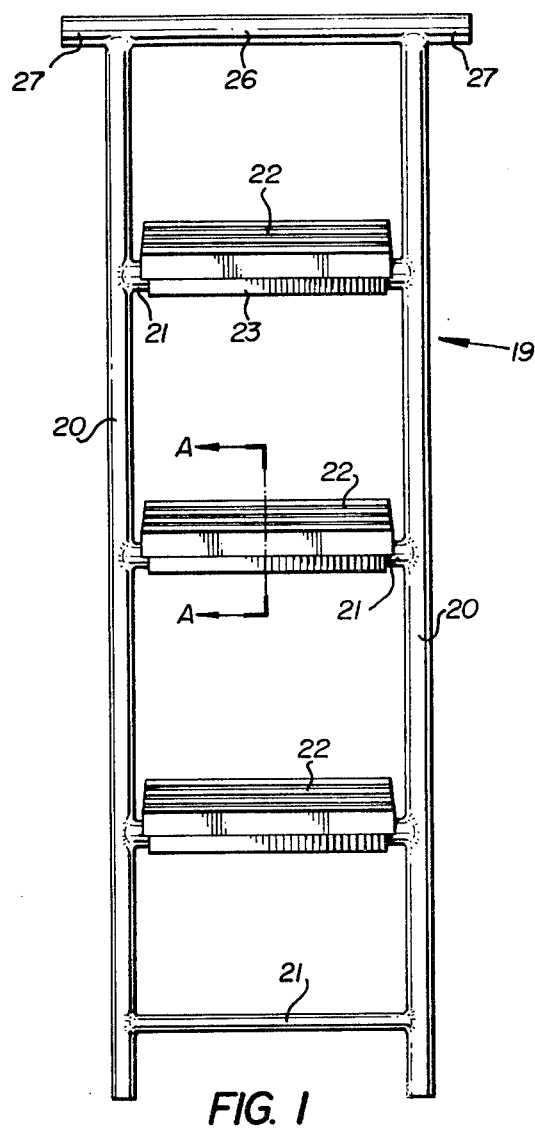
FIG. 1 is a front elevational view of a ladder for use in a ladder assembly embodying the present invention.

Referring to FIGS. 3, 4 and 5 of the drawings, the ladder assembly of the present invention comprises a ladder storage means, generally referenced 1, having, at one end thereof, an entrance 2. The storage means 1 consists of a pair of straight, spaced apart side members 3 having a U-shaped cross-section, arranged parallel to each other. The side members 3 are retained in this configuration by two pairs of spaced apart cross members 4, 4', extending at right angles to the longitudinal axis of each of the side members 3. Each pair 4, 4', of cross members is mounted at each end thereof to a vertical support plate 5 which is rigidly fixed to the side members 3 by welding (not shown). It will be seen from FIG. 4 that the longitudinal axis of each support plate 5 extends at right angles to the longitudinal axis of the side members 3. Furthermore, as shown in FIG. 4, the length of each support plate 5 is greater than the width of the side members 3 so that neither the upper cross members 4 nor the lower cross members 4' contact surfaces of the side members 3. It will also be appreciated (see FIG. 4) that, for stability purposes, the support plates 5 are mounted on the side members 3 such that the lower cross members 4' are nearer to the side members 3 than are the upper cross members 4 to the side members 3.

Referring to FIG. 3, a central spacer bar 6 extends parallel to the side members 3 and is mounted at opposite ends thereof to the lower cross members 4'. A cord securing block 7 provided with a hole 8, is mounted substantially centrally of the spacer bar 6 on the underside thereof approximately halfway between cross members 4'. The lower cross member 4' nearer to the entrance 2 is provided with a U-shaped cord guide 9 through which a first retaining means in the form of a cord 10 (see FIG. 5) can pass. The cord 10 is secured to the block 7 by passing a hook 11 through hole 8 and, with the other end of the cord passing through the guide 9, hook 12 is hooked to ladder 19 when not in use and present in the storage means 1. It will be noted that, to facilitate mounting the storage means to the underside of a load-receiving surface of a truck or van, the end of the spacer bar 6 nearest the entrance 2 curves downwardly at 13 to prevent the steps from striking a flat surface causing them to stick. A substantially U-shaped fixing means 14, which is of the same width as the spacer bar 6 and which curves upwardly away from the side members 3, is rigidly mounted adjacent the underside of the cross member 4 nearest the entrance 2. It will be seen from FIG. 3 that the fixing means 14 is positioned centrally of cross member 4 between the side members 3, and is vertically above the spacer bar 6. The fixing means 14 also serves as a guide for the steps in the ladder to prevent them from striking cross member 4.

Referring to FIGS. 5 and 6, a pair of second ladder retaining means 15 are provided on each of the side members 3 near to the entrance 2. The retaining means 15 are substantially wedge-shaped abutments and are mounted such that the slope of the wedge is downwardly inclined away from the entrance. The retaining means 15 are mounted such that the distance between the end of the side member 3, which are closed by walls 18, and the vertical edge of the wedges is slightly larger than the diameter of tubular cross member 26 (see FIG. 5) of ladder 19. In FIG. 6 a slightly enlarged perspective view of the wedge 15 is shown prior to its installation in a side member 3.

At the end of each side member 3 distant from the end having the ladder retaining means 15 is provided ladder abutment means 16 of substantially trapezoidal shape having an abutment face 17 inclined at substantially 45° to the direction of movement of ladder 19 within the storage means 1. The abutment means 16 is mounted to the side members 3 by means of a nut and bolt combination 18.

Figure 2:
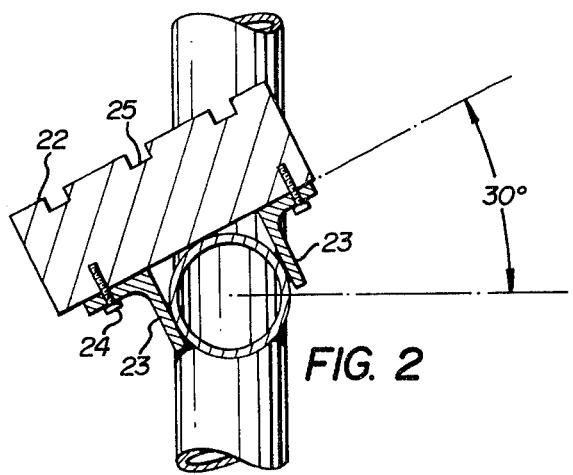
FIG. 2 is a cross-sectional view of one of the step portions of the ladder shown in FIG. 1, the section being taken along the line A—A as indicated in FIG. 1.

Referring to FIG. 1, ladder 19 has a conventional frame including tubular parallel spaced apart side members 20 with tubular rungs 21 extending at right angles therebetween. In the particular embodiment shown in FIG. 1, each rung, except rung 21' which is nearest ground level when the ladder is in use, is provided with a substantially rectangular step block 22 of length slightly less than the rung 21. Block 22 is rigidly fixed to one leg of two elongated L-shaped members 23 by screws 24 (see FIG. 2). The other legs of the L-shaped members 23 are separated from each other by a distance which is substantially equal to the external diameter of the tubular rung 21. As seen in FIG. 2, the L-shaped members 23 are welded to the tubular rung 21 at an angle of approximately 30° so that, in use, when the ladder is inclined at approximately 60° to the horizontal, the upper surface of each block 22 is substantially horizontal, thereby facilitating a person walking up or down the ladder. To provide extra grip and drainage during wet weather, the upper surface of each block 22 is provided with a plurality of longitudinally extending channels 25.

At the end of the ladder opposite that which contacts ground level when the ladder is in use, is provided tubular cross member 26 having opposed lateral projections 27 which extend outside each side member 20. As seen more clearly in FIG. 3, the projections 27 are slidably accommodated in the U-shaped side members 3, which, in effect, act as a track for the projections 27 as the ladder 19 is withdrawn from or retracted into the storage means 1.

In use, the storage means 1, which has been assembled with the portions 27 of the ladder 19 contained in the side members 3, is mounted at the rear of a truck 29 beneath the load-bearing surface 28 (see FIG. 7). When the ladder is not in use, the projections 27 abut against the surface 17 of abutment means 16 and the hook 12, fixed at an end of cord 10, is hooked onto the end rung 21' to prevent the ladder sliding out of the storage means 1 particularly while the vehicle is in motion.

When access to the load-bearing surface 28 is desired, the hook 12 is disengaged from the rung 21' and the ladder is withdrawn, conveniently by gripping the rung 21', from the storage means 1 until the projections 27 slide up the inclined surfaces of the wedges 15 and drop into the space between the wedges and the end walls 18 of the side members 3, which act as stops to prevent complete withdrawal of the ladder from the ladder storage means. The ladder is then placed into contact with the ground so that it is inclined towards the load-bearing surface 28 to facilitate entry thereto. The wedge-shaped members 15 not only prevent the projections 27 from progressing back into the storage means 1, but also serve to prevent twisting of the ladder which may cause the ladder to become disengaged from the storage means 1. When the ladder 19 is no longer required, the cross member 26 is lifted so that the projections 27 pass over and down the inclined portions of the wedge members 15 and, again by holding the end rung 21', the ladder can be readily manually pushed back into the storage means until the projections 27 abut against the surfaces 17. Finally, as a safety precaution, the hook 12 is hooked onto rung 21' to hold the ladder in position in the storage means.

Since the above-described embodiment of the present invention is primarily a safety device, the storage means and the ladder are generally fabricated from steel to withstand not only an individual's weight but also the severe conditions which the assembly will be subjected to under a truck. If the ladder assembly is to be employed for domestic purposes, it may be possible to employ a resilient low density metal, such as aluminum, instead of steel.

As indicated briefly above, it is possible for the ladder assemblies of the present embodiment to be employed in any situation where access from a lower level to an upper level is desired. Examples of such instances are entry into a railway carriage from ground level, entry into a caravan or home trailer, or access to an attic space from a lower level.

Although the length of the ladder 19 is, in part, determined by the distance between the upper and lower levels, it has been found that, for open trucks and vans, a suitable overall length is about 48 inches and the length of the cross member 26, including the both portions 27 is about 18 inches. In this case, the overall length of the storage means 1 is about 49 inches and the overall width is about 18½ inches.

Referring to FIGS. 9 to 13 of the drawings, the modified ladder assembly illustrated therein comprises a ladder storage means, generally referenced 101, having, at one end thereon, an entrance 102. The storage means 101 consists of a pair of straight spaced apart side members 103 having a U-shaped cross-section arranged parallel to each other. The side members 103 are retained in this configuration by two parallel spaced apart cross-members 104, 104' extending between the side members 103 at right angles to the longitudinal axis of each of the side members 103, and by a plurality of parallel equally spaced apart step means 105 extending between the side members 103. In the particular embodiment shown in the drawings, the step means 105 each have an L-shaped cross-section, one leg of the L being firmly mounted to the side members 103 and the other leg providing the step.

As can be readily seen from FIG. 10, the cross-members 104, 104' are mounted at opposite ends of the side members 103 and on opposite faces of the side members 103 to the step means 105.

Referring to FIG. 8, ladder 106 has a conventional frame including tubular parallel spaced apart side members 107 and tubular spaced apart parallel rungs 108 extending at right angles therebetween. At the upper end of the ladder 106 is provided tubular cross-member 109 having portions 110 which extend outside each side member 107. As can be seen clearly in FIGS. 9 and 12, the portions 110 are accommodated in the U-shaped side members 103 which, in effect, act as a guide or track for the portions 110 as the ladder 106 is withdrawn from or retracted into the storage means 101.

Figure 12:
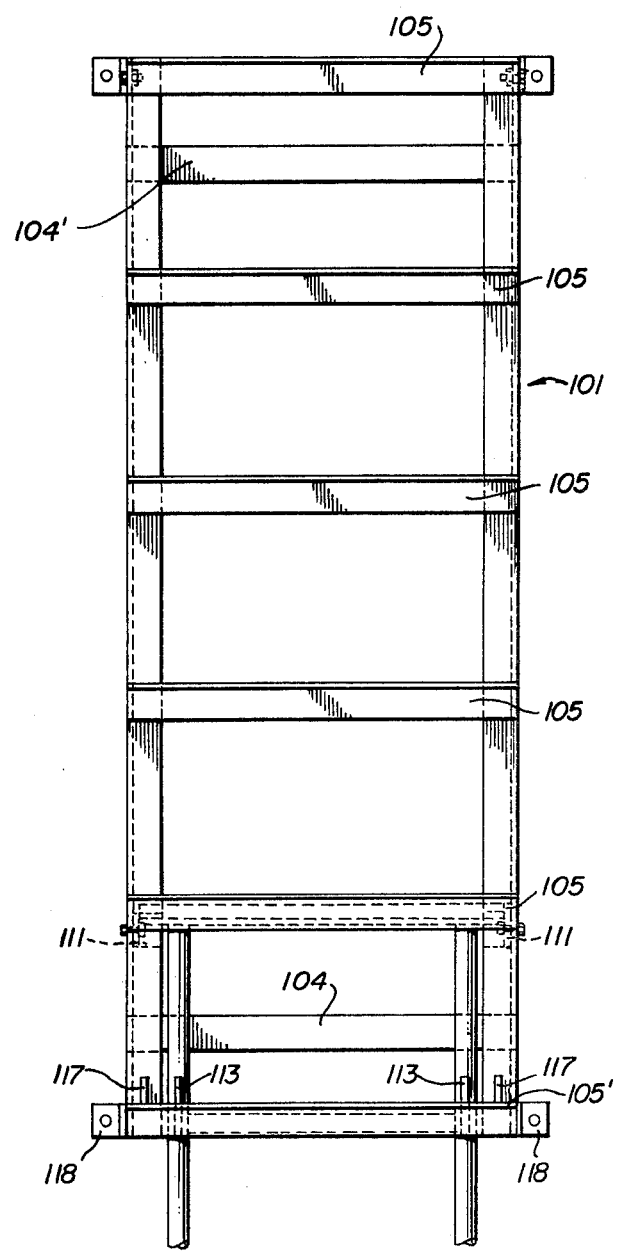
FIG. 12 is a front elevational view of the ladder assembly showing the ladder in the lower position.
Figure 13:
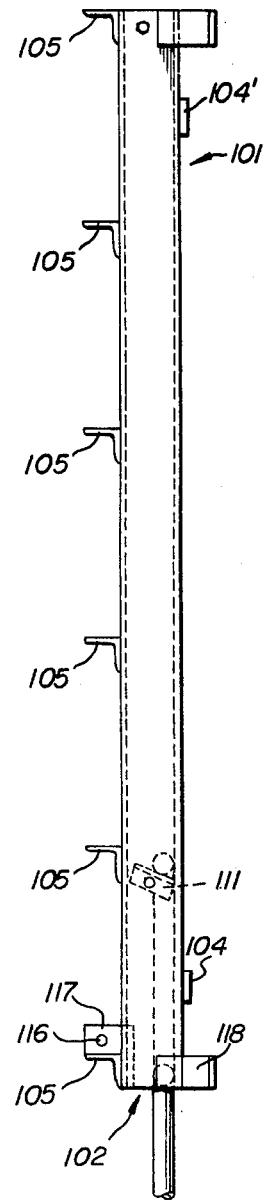
FIG. 13 is a side elevational view of the assembly shown in FIG. 12.

Referring to FIGS. 12 and 13, a pair of ladder retaining means 111 in the form of support brackets are provided inside the side members 103 at a position such that when the ladder is in its lower position (as shown in FIG. 12), the tubular cross-member 109 and the rung 108 which is nearest to cross-member 109 are in register with the two lower step means 105, 105' as shown in FIG. 12. The exact position at which the ladder retaining means 111 is mounted inside the side members 103 can be very readily determined by a person skilled in the art having regard in particular to the diameter of the tubular cross-member 109. The retaining means 111, which are formed from a piece of angle iron, are L-shaped in cross-section with one leg of the L being trapezoidal in shape and the other leg extending at right angles from the shorter parallel side of the trapezium. The retaining means 111 are mounted by means of a nut and bolt 112 such that the leg extending at right angles from the shorter parallel side of the trapezium is normal to the longitudinal axis of the storage means 101. As can be clearly seen from FIG. 10, the leg of the retaining means 111 which is trapezoidal in shape is inclined such that the sloping face of the trapezium is parallel to the longitudinal axis of the side member 103.

Referring again to FIG. 9, the ladder storage means 101 is provided with ladder support means 113, for example metal support posts having a cross-sectional area which is smaller than the internal cross-sectional area of the tubular side members 107 of the ladder 106 and having a length which is greater than the leg of the step means 105' which is fixed to the side members 103. The support means 113 are rigidly fixed (for example by welding) to the lowest step means 105' such that the support means 113 protrude above the level of the step of the step means 105'. Furthermore, as can be seen from FIG. 9, the support means 113 are spaced apart by a distance which is approximately equal to the distance between the centers of the tubular side members 107 of the ladder 106.

According to a preferred feature of the assemblies of the present invention, a flexible safety cord 114 is provided (see FIG. 9) which is provided at each end with a hook means 115 which is adapted to be received in a hole 116 of a plate 117 mounted on each of the side members 103. As can be seen in FIG. 9, when the ladder is in the upper position, and the tubular side members 107 are placed over the support means 113, the flexible safety cord 114 is positioned over the lowest rung of the ladder so that if the ladder becomes disengaged from the support means 113 and moves out of the storage means 101, the rung next to the lowest rung of the ladder comes into engagement with the cord 114 and further movement of the ladder out of the storage means is thereby prevented.

In order to facilitate mounting of the storage means 101 to a tailgate of a dump truck or dump trailer, mounting means 118 are provided at the four corners of the storage means. The mounting means 118 are generally brackets which are mounted to the side members 103 by a nut and bolt 119 (see FIG. 9). Mounting means 118 are provided with a hole 120 through which can be passed a bolt for mounting at a suitable point on the tailgate of a truck 121 as shown in FIG. 14.

Figure 14:
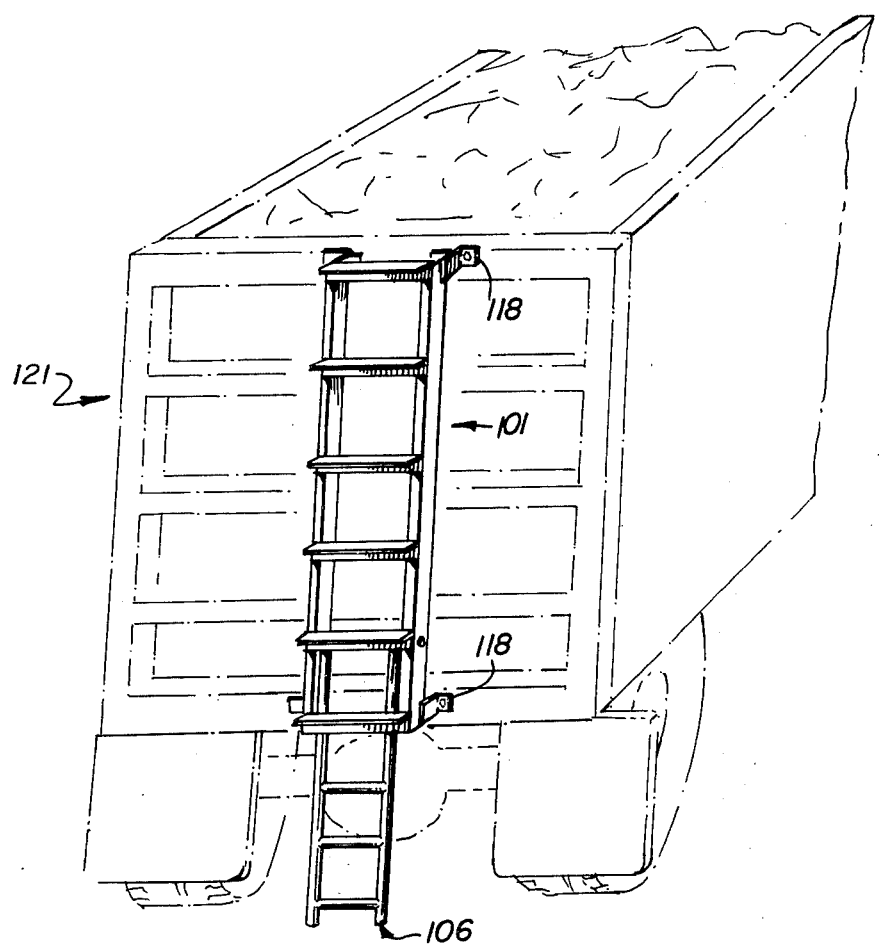
FIG. 14 is a perspective view showing a ladder assembly of the present invention in position on a tailgate of a truck with the ladder in the lower position.

In use, the storage means 101 is generally mounted substantially vertically to the tailgate of a truck as shown in FIG. 14. When the ladder 106 is not in use, the tubular side members 107 are placed over the protruding portions of the support means 113 (usually metal rods) and the bottom of each side member 107 of the ladder abuts against a portion of the step portion of the lowest step means 105′. For safety, the flexible safety cord 114 is placed in position as shown in FIG. 9. When access of the upper regions of the truck is desired, in particular when a tarpaulin or netting is being installed or removed from the truck, the flexible safety cord 114 is removed, the ladder 106 is is lifted upwards to disengage from the rods 113 and then withdrawn vertically downwards from the storage means 101 until the portions 110 engage with the retaining means 112. FIG. 14 shows the instance where the ladder is in the lower position. When the ladder 106 is no longer required, the operator moves the ladder back into the storage means 101 and places the ends of the tubular side members 107 over the rods 113. Finally, the flexible safety cord 114 is placed in position as shown in FIG. 9.

Since the assemblies of the present invention are primarily designed to be installed and employed outdoors on vehicles, the storage means and ladder are generally fabricated from steel to withstand not only an individual's weight but also the severe conditions which the assembly will be subjected to on the truck.

Although the above description of the modified ladder assembly has been made with reference to dump trucks and dump trailers, it will be appreciated that it is possible for the ladder assemblies of the present invention to be employed in any situation where access from a lower level to an upper level is desired, for example, access to the roof of a railway carriage or home trailer, or access to an attic space from a lower level.

I claim:

1. A ladder assembly comprising:
   ladder storage means having an entrance at one end thereof,
   a ladder slidable relative to said ladder storage means through said entrance between a retracted storage position in said ladder storage means and an extended operative position in which said ladder projects from said ladder storage means,
   first retaining means for releasably retaining said ladder in said storage position, and
   second retaining means for retaining said ladder relative to said ladder storage means when said ladder is in said operative position,
   said second retaining means comprising a pair of wedge-shaped abutments respectively secured to said side members adjacent said entrance in the paths of movement of said projections during the sliding of said ladder, and said abutments having first surfaces inclined to said path to facilitate sliding of said projections over said abutments during movement of said ladder towards the operative position, and second surfaces transverse to said path for blocking return movement of said projections.

2. A ladder assembly as claimed in claim 1, wherein said ladder storage means comprise a pair of elongate parallel side members spaced apart to receive said ladder therebetween, and said ladder includes a pair of opposed lateral projections disposed at opposite sides thereof and slidably engaging in said side members, whereby said side members act as guides for the sliding movement of said ladder between said stored and inoperative positions.

3. A ladder assembly as claimed in claim 2, wherein said side members have substantially U-shaped cross-sections for respectively receiving said projections through the open sides of said U-shaped cross-sections.

4. A ladder assembly as claimed in claim 1, wherein said first retaining means comprise a flexible elongate member secured at one end thereof to said ladder storage means, and a hook secured at the opposite end of said flexible elongate member.

5. A ladder assembly as claimed in claim 2, further comprising a pair of stop members secured to said side members at said entrance of said ladder storage means for preventing removal of said ladder from said ladder storage means.

* * * * *